(12) United States Patent
Aridor et al.

(10) Patent No.: US 8,291,419 B2
(45) Date of Patent: Oct. 16, 2012

(54) FAULT TOLERANT SYSTEM FOR EXECUTION OF PARALLEL JOBS

(75) Inventors: Yariv Aridor, Zichron Yaakov (IL); Tamar Domany, Kiryat Tivon (IL); Yevgeny Kliteynik, Carmiel (IL); Edi Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1531 days.

(21) Appl. No.: 11/535,083

(22) Filed: Sep. 26, 2006

(65) Prior Publication Data

US 2008/0077925 A1 Mar. 27, 2008

(51) Int. Cl.
*G06F 9/46* (2006.01)
*G06F 15/16* (2006.01)
*G06F 15/173* (2006.01)
*G06F 11/00* (2006.01)

(52) U.S. Cl. ........ 718/102; 718/104; 709/201; 709/223; 714/1; 714/2

(58) Field of Classification Search .................... 718/102
See application file for complete search history.

(56) References Cited

U.S. PATENT DOCUMENTS

| | | | |
|---|---|---|---|
| 5,634,120 A | 5/1997 | Nagasuka et al. | |
| 5,978,830 A | 11/1999 | Nakaya et al. | |
| 6,178,438 B1* | 1/2001 | Tschirhart et al. | 709/200 |
| 6,438,553 B1* | 8/2002 | Yamada | 1/1 |
| 6,618,820 B1* | 9/2003 | Krum | 714/13 |
| 7,237,140 B2* | 6/2007 | Nakamura et al. | 714/4 |
| 7,386,586 B1* | 6/2008 | Headley et al. | 709/202 |
| 2001/0000194 A1* | 4/2001 | Sequeira | 725/39 |
| 2002/0083116 A1 | 6/2002 | Petrini | |
| 2004/0205377 A1* | 10/2004 | Nakamura et al. | 714/4 |
| 2007/0276901 A1* | 11/2007 | Glinsky et al. | 709/203 |

FOREIGN PATENT DOCUMENTS

JP 10232855 A2 9/1998

* cited by examiner

*Primary Examiner* — Jennifer To

(57) ABSTRACT

The present invention provides a fault tolerant system and method for parallel job execution. In the proposed solution the job state and the state transition control are decoupled. The job execution infrastructure maintains the state information for all the executing jobs, and the job control units, one per-job, control the state transitions of their jobs. Due to the stateless nature of the control units, the system and method allow jobs to continue uninterrupted execution even when the corresponding control units fail.

14 Claims, 4 Drawing Sheets

FAULT TOLERANT SYSTEM FOR EXECUTION OF PARALLEL JOBS

FIELD OF THE INVENTION

The present invention relates to the field of parallel computing. More particularly the invention relates to a parallel computing architecture using Message Passing Interface (MPI).

BACKGROUND OF THE INVENTION

Since the past few decades the computational power of computing devices has increased exponentially. The advancement in hardware, whether in terms of faster, stronger processors or bigger memory, is equally matched by the amount of data to be processed. The amount of data to be processed is so huge at times that a single computer may take days or even years to finish a task.

One of the methods employed to overcome the aforementioned problem is to use parallel computers. Parallel computers are two or more serial computers connected to each other in a particular configuration which communicate with each other for input and output requirements of data to be exchanged between the processes running on them. Using parallel programming, a problem is divided into one or more tasks that can run concurrently. Thereafter these tasks are distributed over a cluster of parallel computers for execution. Once all the tasks have been executed, the results are collated and presented. The use of parallel computing with parallel computers provides a greater memory and Central Processing Unit (CPU) resources to execute a job, thereby reducing the turnaround time for its completion.

Parallel computers broadly follow two types of architectures, i.e., distributed memory and shared memory. In distributed memory architecture, the serial computers have access to their own memory and communicate with other nodes through a communication network.

In shared memory architecture, multiple processing units share a common memory space using a high-speed memory bus.

For a job (i.e., a problem) to run on a parallel computing architecture, it must first be broken down into smaller problems that can run on different processors simultaneously. The smaller problems are referred to as job units. Thus a job consists of two or more job units. A single job unit is a process, which executes concurrently with other job units.

The shared memory architecture does not scale-up well for large jobs i.e., those which comprise of a few tens of job units. On the other hand, the distributed memory architecture on the other hand, does scale well to allow similar large jobs to execute with good performance.

Distributed memory parallel computers use the message passing programming paradigm in which the programmer has to explicitly divide data and work across the processors as well as manage the communication between them.

Message Passing Interface (MPI) implements the "message passing" model of parallel computing. The message-passing model comprises of:

a number of processes running on local data. Each process has its own local variables and does not directly access memory of other processes, sharing of data between processes takes place by passing messages, i.e. explicit sending and receiving of data between processes.

The processes may or may not run on different processing machines. The advantage of the above process is that it provides more control over the flow of data, and can be implemented across a variety of platforms. MPI is usually implemented as a library of functions or subroutines that are inserted in the source code to perform data communication between the processes.

Once a job has been divided into two or more units and allocated some hardware resource from the job execution infrastructure, it changes several states till the time of its completion, These states may include for example, "initial", "loaded", "running", "stopped", "terminated", etc., The transition between states is handled by Mpirun. Mpirun is a job control program which the user uses to launch their jobs on the execution platform. Each job has a corresponding Mpirun program that controls the state transitions of the job. As stated above, a job has two or more job units that run parallel to each other. At any given time, a job i.e. all the job units belonging to the job have the same state. All the job units for a particular job change the state together when instructed by the job control program.

The advantage of using Mpirun to control parallel jobs is that the mpirun can run and control the job from a remote location. It is possible for Mpirun and a parallel job to run on a physically different hardware. The parallel job usually runs on a much more robust hardware than the Mpirun. For instance, one can run a parallel job on the servers in a super-computing facility, but the Mpirun that controls this job may run on a standard office computer. Not only is the office computer built of much less robust hardware, and is sensitive to various aspect of problems, such as power interruption, but one is also exposed to the network "hiccups" between the office and the servers on which the job is running on.

As stated before, Mpirun is responsible for the state transitions of its respective job. Consequently Mpirun also holds the present state of the job it controls.

If, for some reason, the connection to the Mpirun program is lost, for example, if Mpirun is killed, there is no way to reconnect to the job, and the infrastructure takes immediate action to terminate the job. This can be a problem for long executing jobs that are terminated after running for a significant amount of time, losing all their work and wasting resources and time, just because their connection to Mpirun is lost.

In addition, Mpirun needs to closely interact with the job execution infrastructure in order to perform job state transitions, which means that different infrastructures use different Mpirun programs customized for their own specific implementation. This tight coupling between Mpirun and the infrastructure does not allow Mpirun to be easily ported and used on other execution infrastructures.

The aforementioned problems make the parallel job execution architecture prone to faults, as an early-terminated job needs to be executed again from start. Various approaches have been taken in the past, in order to stabilize parallel job execution architecture.

It is known in the art of parallel job processing to store information related to the job execution state in a table. Before terminating a job, information regarding its state is stored. The information is used at a later stage to restart the job. However this approach relates to the problem of saving the 'running' state of jobs when the jobs are in the middle of execution. The approach does not take care of the logical state of the job.

Re-executing an early-terminated job results in wastage of all the computing resources that it had used until it was terminated. 'Periodic Checkpointing' is one solution to reduce such resource wastage. In 'periodic checkpointing' an 'image' of the job (i.e., snapshot of all job units) is saved to a disk at periodic intervals of time. These images can be later restored, in case the job gets terminated because Mpirun is killed, to restore its state to the last checkpoint, and allow it to continue executing from that point, reducing the waste of resources.

The problem with periodic checkpointing is that with the current capacity of today's parallel computers, a parallel job may be composed of a huge number of processes (job units). In such a scale, the time and amount or storage required to periodically checkpoint such a job makes periodic-checkpointing a practically infeasible option.

Therefore there is a need for a system for fault tolerant execution of parallel jobs, that allows the jobs to continue uninterrupted execution even if their control program i.e., Mpirun gets killed or the connection to Mpirun is lost, in order to minimize the waste of resources and time caused by the early termination of the jobs.

SUMMARY OF THE INVENTION

The present invention provides for a system for executing one or more jobs in parallel in a job execution infrastructure. The system comprises of a job distribution unit for allocating at least a portion of the job execution infrastructure to the job, and job control units, one per job, for controlling the state transitions of their jobs.

The present invention also provides for a method for executing one or more jobs in parallel in a job execution infrastructure by allocating at least a portion of the job execution infrastructure to each job unit, and controlling an execution state of each job unit. The state of each job is maintained by the job execution infrastructure and a state transition for each job is communicated to the job execution infrastructure as and when required.

BRIEF DESCRIPTION OF THE FIGURES

The above and other items, features and advantages of the invention will be better understood by reading the following more particular description of the invention in conjunction with the accompanying drawings wherein.

DETAILED DESCRIPTION OF THE INVENTION

The invention will now be described with reference to the accompanying figures. The figures and the description is meant for explanatory purposes only and is in no way intended to limit the inventive features of the invention.

The present invention describes a system and a method for running one or more jobs in parallel on a common job execution infrastructure. The jobs' state is maintained with the job execution infrastructure, thereby decoupling the control units from the actual execution of their jobs. Should the connection to the control unit be lost for any reason, the execution infrastructure allows the jobs to continue uninterrupted execution since the state of the jobs is maintained with the infrastructure, and not with the control units.

The control units have a similar role as the Mpirun programs, in that control units are programs used to launch the jobs on the execution infrastructure. Control units differ from Mpirun in that control units are stateless with respect to the jobs they control. This allows jobs to continue uninterrupted execution even if their corresponding control units are killed.

The actual state of all jobs is maintained by the job execution infrastructure, which exports an interface for jobs state query and control. The control units query the state of their jobs, and communicate state transitions to the execution infrastructure using that interface.

In parallel computing a typical job is divided by a programmer into two or more units, each of which has hardware resources allocated to it. One or more job units may share the hardware resources, or hardware resources maybe dedicated to each job unit. The jobs are executed using the hardware resources. Each complete job that is run in parallel is referred to as 'job', and each division as a 'job unit'. Each job unit is equivalent to a process.

Figure 1:
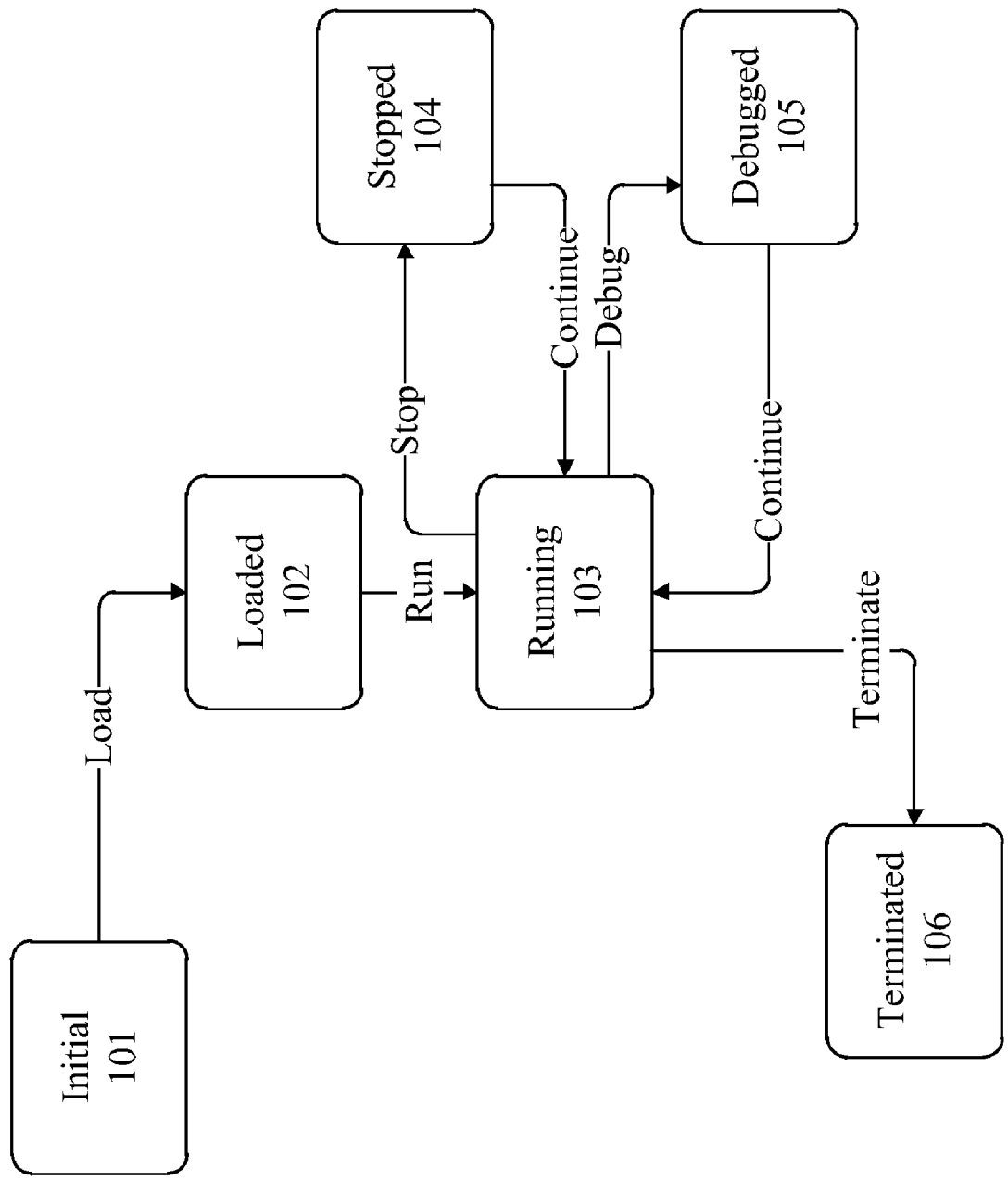
FIG. 1 shows the various states of a process during a normal execution cycle.

During a typical execution cycle a job may go through various job states. FIG. 1 shows the various states that a job may undergo during its lifecycle. At first when a new job is created, it is in the 'initiated' state 101. Thereafter in order to start the execution of the job it is loaded 102. Once the job is loaded, it is given the run command to get it into the running state 103. While a job is running, its process may be stopped 104, to be resumed later and restore it back to running state 103. A job may also be put in a debugging mode 105 and then be resumed to the running state 103. A running job may be naturally terminated or it may terminate because of some error 106. All the job units, i.e., the sub processes of a job, have the same state at any given point of time.

Mpirun is the program used by the user to launch his job, in a typical parallel computing environment. Mpirun controls the state transitions of the job until the job is completed. A system that implements such a parallel computing environment is shown in FIG. 2.

Figure 2:
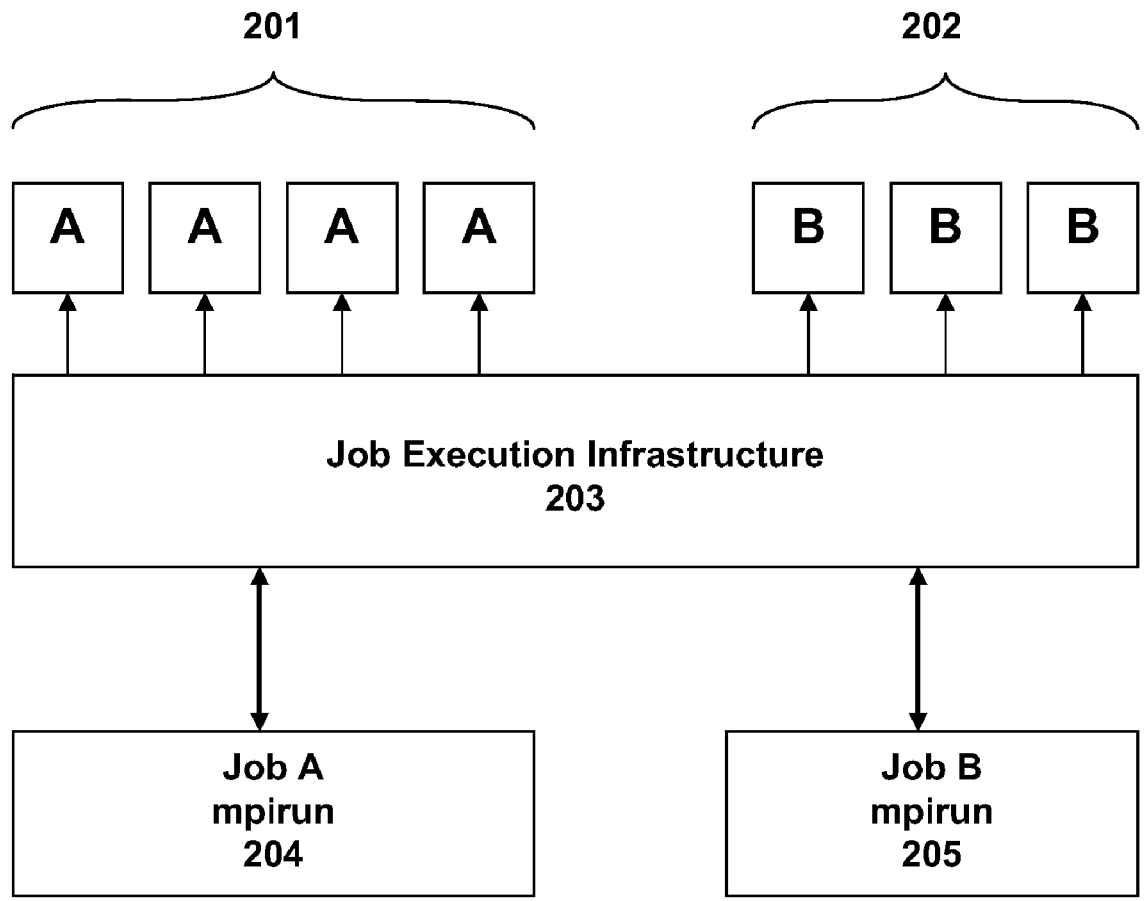
FIG. 2 shows an example of a parallel job execution architecture.

As shown in FIG. 2, jobs A and B may be decomposed into two or more job units 201 and 202. The job units are allocated hardware resources on the job execution infrastructure 203 and are executed in parallel. The state of a particular job is maintained by its corresponding Mpirun program 204 and 205, which also controls the job's state transitions. These Mpirun programs communicate state transitions for the jobs to the execution infrastructure 203. The job execution infrastructure 203 is stateless with regard to the state of jobs, whereas the Mpirun programs are state-full.

If the connection to Mpirun is lost for some reason, in the aforementioned setup, the job execution infrastructure takes immediate action to terminate the corresponding job. This results in waste of all resources consumed by the job until its early termination. Furthermore, in such a setup, the Mpirun is closely coupled with the job execution infrastructure. Since, the Mpirun is actually responsible for performing the state transitions, it is difficult to achieve the portability of Mpirun to different platforms.

Figure 3:
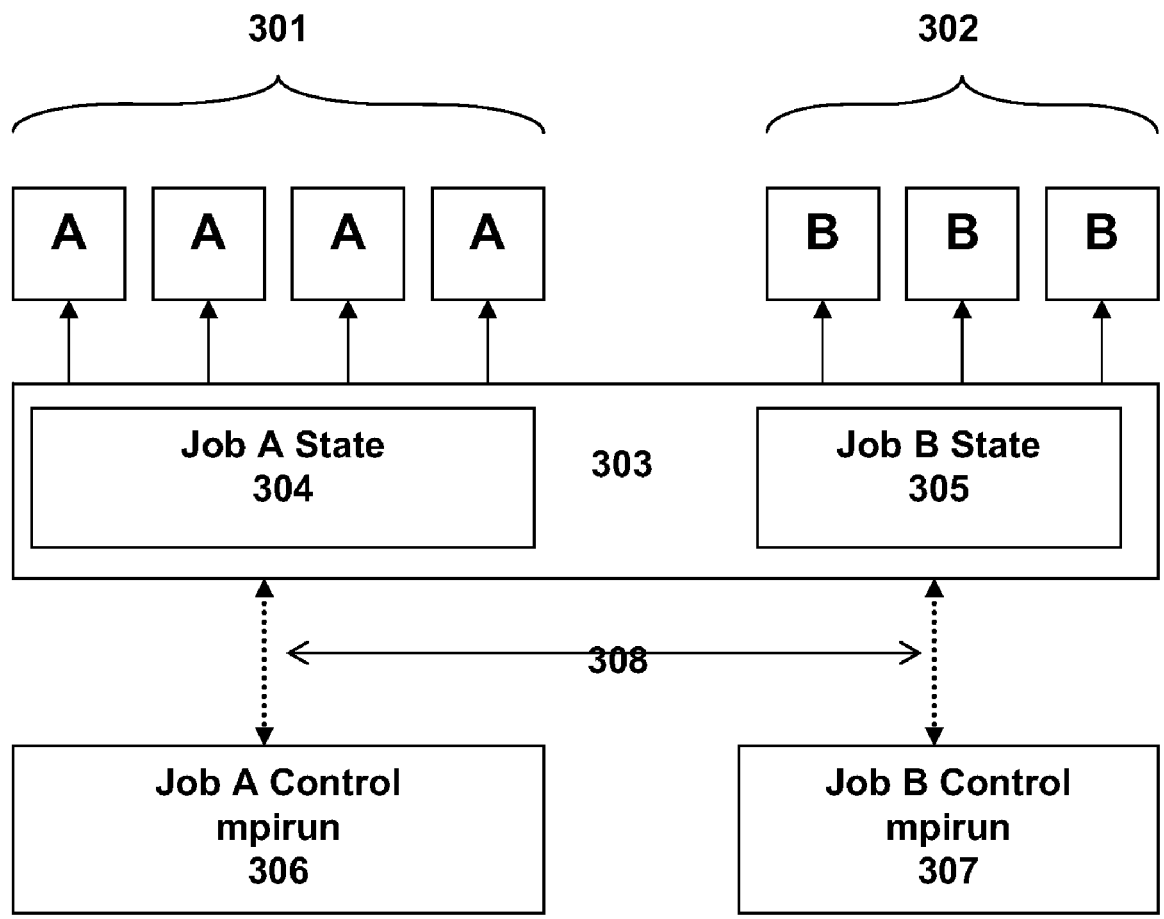
FIG. 3 shows a job execution architecture according to an embodiment of the invention.

The present invention proposes to overcome the aforementioned drawback by decoupling the control and the state maintenance of jobs. FIG. 3 shows an embodiment according to the present invention. Once a job is received, that has been divided into two or more job units, a job allocation unit (not shown) allocates the job units 301 and 302 hardware resource on the job execution infrastructure 303. Apart from executing the jobs, the job execution infrastructure also maintains the information on the present state of the different jobs 304 and 305. For example, job 304 may be in state "running" while job 305 may be in state "stopped". In this setup, stateless Mpirun (also called 'control unit') is responsible only for controlling state transitions for jobs 306 and 307. The actual low level transition of state is carried out by the job execution infrastructure 303, which exports an interface 308 for state transitions control and monitoring. Any control-unit implementation, that conforms to the interface, even one on a different platform, may control parallel jobs on that execution infrastructure.

In the above setup, the job execution infrastructure would maintain the job in its current state instead of terminating it, even if the connection to the control unit is lost for some reason. If the job is in state of "running" when it terminates, the infrastructure moves the job to a "terminated" state. At a later time, a subsequent control unit can reconnect to the job, by polling its current state from the infrastructure. This subsequent control unit can then continue to control the job's state transitions. In this manner the work performed by long executing jobs is not lost and resources are not wasted.

Figure 4:
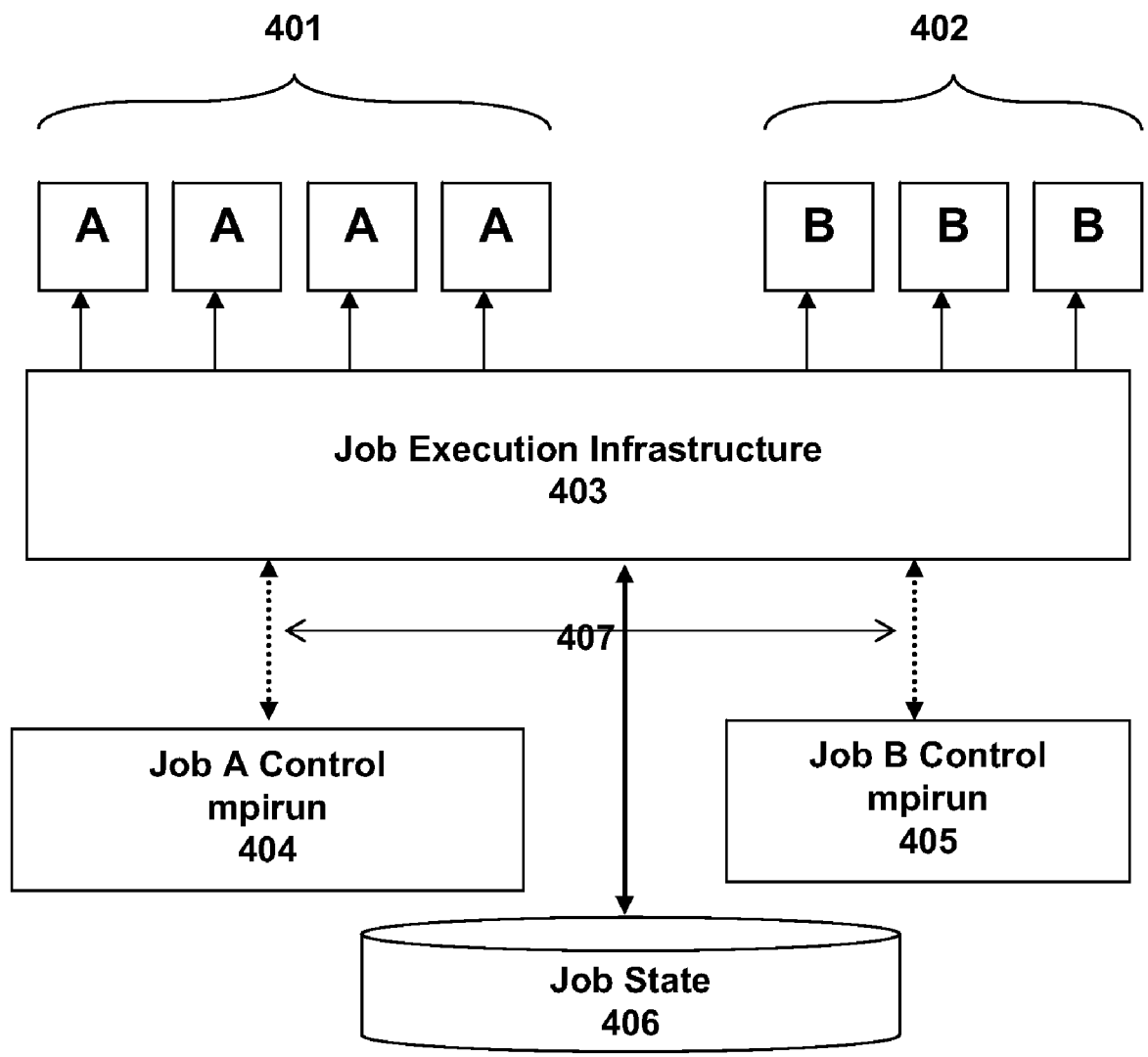
FIG. 4 shows a job execution architecture according to another embodiment of the invention.

In yet another embodiment of the aforementioned concept, in particular for the Blue Gene/L™ supercomputer system as shown in FIG. 4, the jobs state information is maintained in a DB2 database 406, and the execution infrastructure 403 uses a DB2 client to connect to the database, update jobs state, and answer job state queries from the job control units. The job execution infrastructure exports a set of Application Programming Interfaces (APIs) for adding and removing jobs, querying jobs states and performing state transitions.

The Mpirun programs 404 and 405 interact with the job execution infrastructure 403 using these APIs. To perform a state transition, the Mpirun calls the corresponding API, and the BlueGene/L execution infrastructure handles the rest. To check if the state transition completes successfully, the control units use the 'query API'. The execution infrastructure will answer the query from the database 406.

There is no need to maintain a permanent connection between the control units and the infrastructure. This allows flexibility to an extent that the control units can be killed, re-restarted, suspended and resumed, and the job will still remain in its current state. The job will continue uninterrupted execution, or moved to a 'terminated' state by the infrastructure, on its termination.

The basis for maintaining a connection between the infrastructure and the control units is for streaming input and output. However, by buffering input and output, and later streaming it to a subsequent control unit, the infrastructure can maintain a continuity in execution of jobs, even if the connection is lost.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

We claim:

1. A system for executing one or more jobs in parallel in a job execution infrastructure, wherein each job comprises one or more job units, the system comprising:
    a job execution infrastructure comprising:
        one or more processors for executing a plurality of jobs in parallel; and
        a job distribution unit for allocating the plurality of jobs to the one or more processors for execution,
    wherein the job execution infrastructure is remotely in communication with one or more job control units, wherein at least one job control unit is executed on a computing system connected to the job execution environment over a communications network;
    wherein the one or more job control units respectively initiate execution of one or more jobs on the job execution infrastructure,
    wherein execution state of at least one job is maintained in a data structure locally coupled to the job execution infrastructure, and the execution state of each job is remotely communicated to each job control unit such that:
        if connection between the job execution infrastructure and a first job control unit associated with a first job executed over the job execution infrastructure is terminated,
        then without active human interaction the execution of the first job is terminated and the execution state of the first job is stored in the data structure locally coupled to the job execution infrastructure,
    wherein, in response to determining that the connection between the first job control unit and the job execution infrastructure is reinstated, the execution state of the job is communicated to the first job control unit and the execution of the first job is continued from the point of termination based on state information stored in the data structure locally coupled to the job execution infrastructure, instead of having to start the execution of the first job from a time prior to the point of termination based on state information stored at the first job control unit, and
    wherein the job control units remain stateless with regards to the plurality of jobs that the job control units control.

2. The system of claim 1, wherein execution states of a job comprises: initial, loaded, running, stopped, debugged and terminated.

3. The system of claim 1, wherein the job execution infrastructure comprises a job control interface used for issuing queries and communicating execution state transitions for jobs being executed to the job control units.

4. The system of claim 3, wherein a job control unit that conforms to the job control interface of said execution infrastructure issues queries and communicates execution state transitions for a job it controls, through the job control interface.

5. The system of claim 1, wherein the job execution infrastructure maintains the execution state of all jobs in a database coupled to the job execution infrastructure.

6. The system of claim 1, wherein currently executing jobs continue uninterrupted execution even if their corresponding job control units fail.

7. The system of claim 6, wherein a failed job control unit takes control over the corresponding executing job after the failed job control unit restarts by querying current state of the corresponding executing job from the execution infrastructure.

8. A method for executing one or more jobs in parallel in a job execution infrastructure, wherein each job comprises one or more job units, the method comprising:
    executing a plurality of jobs in parallel using one or more processor in a job execution infrastructure; and
    allocating the plurality of jobs to the one or more processors for execution using a job distribution unit,
    wherein the job execution infrastructure is remotely in communication with one or more job control units, wherein at least one job control unit is executed on a computing system connected to the job execution environment over a communications network;

wherein the one or more job control units respectively initiate execution of one or more jobs on the job execution infrastructure, maintaining execution state of at least one job in a data structure locally coupled to the job execution infrastructure, and communicating the execution state of each job remotely to each job control unit such that if connection between the job execution infrastructure and a first job control unit associated with a first job executed over the job execution infrastructure is terminated, the execution of the first job is terminated and the execution state of the first job is stored in the data structure locally coupled to the job execution infrastructure, such that when the connection between the first job control unit and the job execution infrastructure is reinstated, the execution state of the job is communicated to the first job control unit and the execution of the first job is continued from the point of termination based on state information stored in the data structure locally coupled to the job execution infrastructure, instead of having to start the execution of the first job from a time prior to the point of termination based on state information stored at the first job control unit, wherein the job control units remain stateless with regards to the plurality of jobs that the job control units control.

9. The method of claim 8, wherein execution states of a job comprises: initial, loaded, running, stopped, debugged and terminated.

10. The method of claim 8, wherein the job execution infrastructure comprises a job control interface used for issuing queries and communicating execution state transitions for jobs being executed to the job control units.

11. The method of claim 10, wherein a job control unit that conforms to the job control interface of said execution infrastructure issues queries and communicates execution state transitions for a job it controls, through the job control interface.

12. The method of claim 8, wherein the job execution infrastructure maintains the execution state of all jobs in a database coupled to the job execution infrastructure.

13. The method of claim 8, wherein currently executing jobs continue uninterrupted execution even if their corresponding job control units fail.

14. The method of claim 13, wherein a failed job control unit takes control over the corresponding executing job after the failed job control unit restarts by querying current state of the corresponding executing job from the execution infrastructure.

* * * * *